(12) United States Patent
Jenkines

(10) Patent No.: US 8,062,709 B2
(45) Date of Patent: Nov. 22, 2011

(54) HOT PROCESSING OF POLYURETHANE CARPET BACKING SYSTEMS USING DUAL DELAYED ACTION CATALYSTS

(75) Inventor: Randall C. Jenkines, Dalton, GA (US)

(73) Assignee: Dow Global Technologies LLC, Midland, MI (US)

( * ) Notice: Subject to any disclaimer, the term of this patent is extended or adjusted under 35 U.S.C. 154(b) by 488 days.

(21) Appl. No.: 12/295,836

(22) PCT Filed: Mar. 19, 2007

(86) PCT No.: PCT/US2007/006768
§ 371 (c)(1),
(2), (4) Date: Oct. 2, 2008

(87) PCT Pub. No.: WO2007/126613
PCT Pub. Date: Nov. 8, 2007

(65) Prior Publication Data
US 2009/0159196 A1 Jun. 25, 2009

Related U.S. Application Data

(60) Provisional application No. 60/790,336, filed on Apr. 7, 2006.

(51) Int. Cl.
| | | |
|---|---|---|
| B05D 3/02 | (2006.01) | |
| C07F 7/12 | (2006.01) | |
| C07F 7/22 | (2006.01) | |
| C08G 18/00 | (2006.01) | |
| C08G 18/08 | (2006.01) | |
| C08G 18/16 | (2006.01) | |
| C08G 18/22 | (2006.01) | |
| C08G 18/24 | (2006.01) | |
| C08G 18/28 | (2006.01) | |
| C08J 3/00 | (2006.01) | |
| C08K 5/00 | (2006.01) | |
| C08K 5/04 | (2006.01) | |
| C08K 5/09 | (2006.01) | |
| C08K 5/57 | (2006.01) | |
| C08L 75/00 | (2006.01) | |
| D06M 15/693 | (2006.01) | |
| H01B 1/12 | (2006.01) | |

(52) U.S. Cl. .................. 427/372.2; 427/373; 427/385.5; 427/389; 427/389.7; 427/389.9; 524/174; 524/178; 524/179; 524/180; 524/394; 524/398; 524/589; 524/590; 528/44; 528/48; 528/55; 528/56; 528/58; 528/65; 528/85

(58) Field of Classification Search .................. 524/174, 524/178, 179, 180, 394, 398, 589, 590; 528/44, 528/48, 55, 56, 58, 65, 85; 427/372.2, 373, 427/385.5, 389, 389.7, 389.9
See application file for complete search history.

(56) References Cited

U.S. PATENT DOCUMENTS

| | | |
|---|---|---|
| 3,772,244 A | 11/1973 | Wowk |
| 3,813,424 A | 5/1974 | Hayashi et al. |
| 3,849,156 A | 11/1974 | Marlin et al. |
| 4,395,528 A * | 7/1983 | Leiner et al. .................... 528/45 |
| 4,696,849 A | 9/1987 | Mobley et al. |
| 6,140,381 A | 10/2000 | Rosthauser et al. |

FOREIGN PATENT DOCUMENTS

| | | |
|---|---|---|
| EP | 0309816 | 4/1989 |
| WO | WO-87/01656 | 3/1987 |
| WO | WO-96/27625 | 9/1996 |
| WO | WO-98/08893 | 3/1998 |
| WO | WO-00/04223 | 1/2000 |
| WO | WO-2005/123798 | 12/2005 |

* cited by examiner

Primary Examiner — Patrick Niland

(57) ABSTRACT

A process for preparing polyurethane carpet backings uses a filled polyurethane-forming composition that contains a mixture of certain metal acetylacetonate and sulfur-containing organotin catalysts. The mixture of catalysts is particularly beneficial in instances where the composition is processed at temperatures of above 30 to about 500 C, as long pot life is provided together with a rapid thermally-induced cure.

17 Claims, No Drawings

HOT PROCESSING OF POLYURETHANE CARPET BACKING SYSTEMS USING DUAL DELAYED ACTION CATALYSTS

The invention relates to methods for manufacturing polyurethane carpet backing products.

Many carpet products have an attached polyurethane backing. These have been commercially available for many years. Methods for making those carpets are described, for example, in U.S. Pat. Nos. 3,849,156, 4,296,159, 4,336,089, 4,405,393, 4,483,894, 4,611,044, 4,696,849, 4,853,054, 4,853,280, 5,104,693, 5,646,195, 6,140,381, 6,372,810 and 6,790,872.

The design and construction of these carpet products can vary significantly depending on specific end-use applications and market segments. Polyurethane backings accordingly perform different functions in these various types of products. The different types of polyurethane carpet backings include precoats, unitary coatings, laminate (tie) coatings, foam coatings and hardback cap coatings.

A polyurethane precoat is the first coating which is applied to a carpet. Its function is to provide face fiber strength properties, liquid barrier properties and flame retardancy properties. A laminate coating serves to attach a secondary fabric or glass fabric reinforcement to a carpet. In addition to serving as an adhesive, the laminate coating also provides delamination strength resistance, liquid barrier properties and dimensional stability to the carpet.

In some carpet products, a polyurethane foam coating is applied to the precoat and replaces the laminate coating. Its function is to provide cushioning and comfort underfoot. Tie-coats and hard back cap coatings are used in carpet tile (modular) products. The tie-coat serves to tie a fiber glass fabric to the precoated tile. A hard back cap coat in carpet tile serves as the wear-layer for the carpet tile and provides weight to the modular product.

The attached polyurethane is usually prepared by applying a polyurethane-forming composition to the back of the carpet and permitting the composition to cure in place. A foam backing is usually prepared by frothing the mixture before it is applied. The curing characteristics of these compositions are very important to the operation of the process. The viscosity of the composition builds as it reacts, until finally the composition cures to form a cellular polymer. The polyurethane-forming formulation must be mixed, dispensed onto the carpet, spread over the carpet back and gauged while the viscosity of the composition is still relatively low. If the system reacts and viscosity builds up too quickly, the composition cannot be spread and gauged properly, and the resulting product will have defects that range from cosmetic (irregular surface appearance, poor cell structure) to structural (lack of adhesion to the substrate, uneven coating thickness, etc.). On the other hand, a rapid cure is wanted once the composition is spread and gauged. Curing is most often done by passing the coated substrate through an oven on tenter chains or over heated platens using a belt conveyor. A slower cure means that a longer, more expensive oven or additional or larger platens are needed, that slower line speeds must be used, or some combination of these are needed. Slow cure rates therefore increase capital or operating costs, or both.

The desire for a delay in the initial viscosity build-up tends to conflict with the desire for a fast cure rate once the polyurethane composition is applied and gauged. Conditions which favor a fast cure rate tend to work against a delayed onset of cure. For example, it has been attempted to delay the onset of reaction by reducing the catalyst level, but this tends to slow the later cure rate, too. The best approach to date has been to use a specific heating regimen combined with the use of certain heat-activated catalysts. The polyurethane composition is maintained at relatively low temperatures, typically at or below about 30° C., until it is applied and gauged. At that point, the composition is heated to a much higher temperature, typically from 120 to 150° C., to drive the cure. The catalyst is a delayed action type which is inactive or inefficient at the lower temperatures. Sulfur-bridged organotin catalysts such as dibutyltin sulfide and certain dithiastannetanes (as described in U.S. Pat. No. 6,140,381) are examples of catalysts that are inefficient (rather than inactive) at 30° C. but become quite efficient at the higher curing temperatures. The dithiastannetanes are not readily available and have not found much commercial acceptance for that reason. Nickel acetylacetonate is a heat-activated catalyst that has been used in carpet-backing applications. Nickel acetylacetonate remains inactive until it is heated to above 50° C. This class of catalysts provides a very long pot life but they are not very good curing catalysts.

The foregoing catalytic approach works well if the starting viscosity of the polyurethane composition is not too high. However, the polyurethane composition in most cases contains a significant amount of a filler material. This material is usually included to reduce formulation costs, but can also modify the foam physical properties in a useful way and can provide attributes such as flame retardancy. The presence of the filler very substantially increases the viscosity of the composition. The increased viscosity creates higher backpressure and also makes it difficult to mix and/or froth (in the case of a foam backing), dispense, spread and gauge the composition while maintaining its temperature at 30° C. or below. A somewhat higher temperature is needed in some cases in order to reduce the viscosity enough that these processing steps can be performed efficiently. Even relatively small temperature increases, to within the range of 35 to 50° C., can have a significant impact on the viscosity of the system. In other cases, the mixture might be capable of being processed at the lower temperatures, but the increased energy needed to perform the frothing, dispensing, spreading and/or gauging steps (due to the high system viscosity) creates a lot of waste heat. The waste heat drives the temperature of the composition upward.

Unfortunately, the increased temperature also significantly reduces pot life. This effect is seen even with relatively small temperature increases, of the order of 5° C. The composition reacts too quickly, rapidly becomes too viscous to spread and gauge, and cosmetic or structural defects occur. As before, reductions in the catalyst level can solve this, but at the expense of longer cure times.

It would be desirable to provide a polyurethane composition that exhibits a long pot life at a temperature of 30-50° C., and which reacts quickly when exposed to a higher curing temperature.

This invention is a process comprising:

a) forming a polyurethane-forming composition, the polyurethane-forming composition including a polyol having an equivalent weight of at least 300 or a mixture thereof with at least one other isocyanate-reactive material, at least one polyisocyanate in an amount sufficient to provide an isocyanate index of from 85 to 130, a particulate inorganic filler, from 0.05 to 0.5 part by weight per 100 parts by weight of isocyanate-reactive materials of a nickel, cadmium or copper acetylacetonate catalyst, and from 0.001 to 0.1 part by weight per 100 parts by weight of isocyanate-reactive materials of an organotin catalyst in which each tin atom is bonded to at least one sulfur atom;

b) forming a layer of the composition on a substrate;

wherein the temperature of the composition is maintained at or below 50° C. during steps a) and b) and then c) heating the composition to a temperature from 80 to 180° C. to cure the composition and form a polyurethane layer bonded to the substrate.

In another aspect, this invention is a formulated polyol mixture comprising at least one polyol having an equivalent weight of at least 300 or a mixture thereof with at least one other isocyanate-reactive material, a particulate inorganic filler, from 0.05 to 0.5 part by weight per 100 parts by weight of isocyanate-reactive materials of a nickel, cadmium or copper acetylacetonate catalyst, and from 0.001 to 0.1 part by weight per 100 parts by weight of isocyanate-reactive materials of an organotin catalyst in which each tin atom is bonded to at least one sulfur atom.

The polyol formulation is characterized by having a pot life and a cure time that facilitate its use in carpet-backing processes and other processes in which the composition is formed into a layer on a substrate and then cured.

In still another aspect, this invention is a process comprising forming a compounded polyol having pH of from 7.0 to 9.25, the compounded polyol containing at least one polyol and at least one particulate organic filler, forming a polyurethane-forming composition by mixing said compounded polyol with at least one polyisocyanate and at least one organotin catalyst in which each tin atom is bonded to at least one sulfur atom, forming the composition into a layer on a substrate, and then curing the composition to form a polyurethane layer bonded to the substrate.

The polyurethane-forming formulation contains at least one polyol that has a hydroxyl equivalent weight of at least 300. The hydroxyl equivalent weight of the polyol is preferably from about 500 to about 3000, especially from about 500 to about 1500. The polyol advantageously has an average nominal functionality of from about 1.8 to about 4, especially from about 2 to about 3 hydroxyl groups/molecule. A mixture of such polyols can be used. Suitable polyols include polyether polyols and polyester polyols. Polyether polyols are generally more preferred. Particularly suitable polyether polyols are polymers of propylene oxide, which may contain up to 20% by weight terminal poly(ethylene oxide) blocks, random copolymers of propylene oxide and up to about 15% by weight ethylene oxide, poly(tetramethylene oxide) polymers and poly(butylene oxide) polymers. Suitable polyester polyols include hydroxymethyl group-containing polyester polyols of the type described in WO 04/096882 and WO 04/096883. Other useful polyols include "blown" vegetable oil-based polyols as described in US Published Patent Applications 2002/0121328, 2002/0119321 and 2002/0090488. Preferred polyols have mainly secondary hydroxyl groups, such as at least 70%, 80%, 90% or 98% of its hydroxyl groups being secondary hydroxyl groups. Secondary groups tend to react with polyisocyanates more slowly than do primary hydroxyl groups, and may be selected to further help to delay the onset of reaction as the composition is mixed, frothed and applied.

The term "polyol mixture" is used herein to refer to a mixture containing at least one polyol as just described, and at least one other material having at least two isocyanate-reactive groups. The other material may be, for example, another compound having two or more hydroxyl groups/molecule, a compound having two or more primary or secondary amino groups per molecule, or a compound having at least one hydroxyl and at least one primary or secondary amino group/molecule.

Particularly suitable components of a polyol mixture, in addition to the polyol described before, include a chain extender or crosslinker. For purposes of this invention, a chain extender is a material having two isocyanate-reactive groups/molecule and an equivalent weight per isocyanate-reactive group of from about 30 to 150. A crosslinker, for purposes of this invention, is a compound having three or more isocyanate reactive groups and an equivalent weight per isocyanate-reactive group of 150 or less. The isocyanate-reactive groups may be hydroxyl, primary amine or secondary amine groups. Chain extenders and crosslinkers having hydroxyl groups are preferred because hydroxyl groups react more slowly and thus provide more time to apply and gauge the polyurethane-forming layer. Examples of suitable chain extenders include ethylene glycol, diethylene glycol, triethylene glycol, propylene glycol, dipropylene glycol, tripropylene glycol, 1,4-dimethylolcyclohexane, diethyltoluene diamine, 1,4-butane diol, 1,6-hexane diol, 1,3-propane diol, amine-terminated polyethers such as Jeffamine D-400 from Huntsman Chemical Company, amino ethyl piperazine, 2-methyl piperazine, 1,5-diamino-3-methyl-pentane, isophorone diamine, ethylene diamine, hexane diamine, hydrazine, piperazine, mixtures thereof and the like. Amine chain extenders can be blocked, encapsulated, or otherwise rendered less reactive in order to reduce the reactivity of the formulation and provide more working time to apply and gauge the foam layer. Chain extenders advantageously constitute up to about 30%, especially up to about 20% of the total weight of the polyol mixture.

The polyurethane-forming composition also includes at least one organic polyisocyanate, which may be an aromatic, cycloaliphatic, or aliphatic isocyanate. Examples of suitable polyisocyanates include m-phenylene diisocyanate, tolylene-2,4-diisocyanate, tolylene-2,6-diisocyanate, hexamethylene-1,6-diisocyanate, tetramethylene-1,4-diisocyanate, cyclohexane-1,4-diisocyanate, hexahydrotolylene diisocyanate; naphthylene-1,5-diisocyanate, methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, a polymethylene polyphenylisocyanate (PMDI), tolylene-2,4,6-triisocyanate and 4,4'-dimethyldiphenylmethane-2,2',5,5'-tetraisocyanate. Preferably the polyisocyanate is diphenylmethane-4,4'-diisocyanate, diphenylmethane-2,4'-diisocyanate, PMDI, tolylene-2-4-diisocyanate, tolylene-2-6-diisocyanate or mixtures thereof. Diphenylmethane-4,4-diisocyanate, diphenylmethane-2,4'-diisocyanate and mixtures thereof are generically referred to as MDI, and all can be used. Tolylene-2,4-diisocyanate, tolylene-2,6-diisocyanate and mixtures thereof are generically referred to as TDI, and all can be used. Polyisocyanate compounds or mixtures thereof having from about 1.8 to about 2.5 isocyanate groups/molecule, on average, are preferred, especially those having an average of about 1.9 to about 2.3 isocyanate-groups/molecule. Prepolymers made by reacting a stoichiometric excess of any of the foregoing polyisocyanates with an isocyanate-reactive compound such as those described below can be used as well. Suitable prepolymers include soft segment prepolymers as described in U.S. Pat. No. 5,104,693 and hard segment prepolymers as described in U.S. Pat. No. 6,372,810.

When the polyurethane backing is substantially non-cellular, as in a precoat, unitary or laminate layer, it is preferably formulated with careful control of the functionality of the components, as described in U.S. Pat. Nos. 4,296,159 and 4,737,455. By selecting components having an actual average functionality of very close to 2.0, a more dimensionally stable product can be obtained. Control over functionality need not be so stringent when a polyurethane foam cushion is attached.

The composition contains a mixture of two specific types of catalysts. The first type is nickel acetylacetonate, cadmium acetylacetonate, copper acetylacetonate, or a mixture of two or more thereof. This catalyst type is present in an amount of from 0.05 to 0.5 parts per 100 parts by weight polyol or polyol mixture. A preferred amount is from 0.1 to 0.3 parts, and a more preferred amount is from 0.1 to 0.25 parts, again based on 100 parts by weight polyol or polyol mixture. Among these catalysts, nickel acetylacetonate is more preferred.

The second component of the catalyst package is a sulfur-containing organotin catalyst. Each tin atom in the catalyst is bonded to one or more sulfur atoms. Sulfur atoms therefore form 'bridges' between a tin atom and another atom, such as a carbon atom or another tin atom. Examples of suitable sulfur-containing organotin catalysts include dialkyltinsulfides, wherein the alkyl groups each contain from 1 to 12 carbon atoms, preferably from 1 to 8 carbon atoms, and can be linear or branched. These materials may exist at least partially in the form of dimers and/or trimers which contain a 4- or 6-member ring having alternating sulfur and tin atoms. Di-n-butyltin sulfide is a preferred example of this type of catalyst. Other examples of sulfur-containing organotin catalysts include dialkyltin mercaptides and dialkyltin mercaptoacetates, in which the alkyl groups again contain from 1 to 12 carbon atoms, preferably from 1 to 8 carbon atoms. Mercaptide groups have the general structure —S—R, where R is linear or branched alkyl suitably containing from 1 to 12, especially from 1 to 8 carbon atoms. Mercaptoacetate groups have the general structure —S—CH$_2$—C(O)—O—R$^1$, wherein R$^1$ is alkyl having from 1 to 12 carbon atoms. Preferred R$^1$ groups are methyl, n-butyl, isobutyl, n-octyl and isooctyl. Dialkyltin mercaptoacetate catalysts of particular interest include dimethyltin diisooctylmercaptoacetate, di-n-butyltin diisooctylmercaptoacetate and dioctyltin diisooctylmercaptoacetate, which are commercially available from GE Silicone-OSi Specialties under the designations Fomrex™ UL-24, UL-6 and UL-29, respectively. Another useful type of sulfur-containing organotin catalyst is a dithiastannetane catalyst as described in U.S. Pat. No. 6,140,381.

The sulfur-containing organotin catalyst is suitably used in an amount from 0.001 to about 0.1 parts per 100 parts by weight polyol or polyol mixture. A preferred range is from 0.002 to 0.05 parts and a more preferred range is from 0.005 to 0.025 parts, again by weight based on 100 parts by weight polyol or polyol mixture.

The catalyst(s) may be encapsulated in wax or other low-melting material in order to provide a more delayed reaction.

The polyurethane-forming composition contains a filler, which reduces overall cost and may improve flame resistance, firmness and other physical properties. The filler may be present in an amount from about 5 to about 1000 parts by weight per 100 parts by weight isocyanate-reactive materials. Suitable fillers include talc, mica, montmorillonite, marble, barium sulfate (barytes), milled glass, granite, milled glass, calcium carbonate, aluminum trihydrate, carbon, aramid, silica, silica-alumina, zirconia, talc, bentonite, antimony trioxide, kaolin, coal-based fly ash and boron nitride. The filler is present in the form of finely divided particles. Particle size may range widely from as little as 10 nm to as much as 250 microns.

A particular advantage of this invention is that more viscous polyurethane-forming compositions can be processed readily because higher temperatures can be used during the frothing, dispensing and gauging steps. Filler level has been found to impact viscosities significantly, particularly at higher loadings. Thus, embodiments of the invention in which the filler level is relatively high are of particular interest. Preferred filler levels are from 130 to 600, especially from 250 to 400, parts by weight of filler per 100 parts by weight isocyanate-reactive materials.

It has been found that the pH of the compounded polyol/filler mixture can significantly affect the pot life and cure of the composition. Although the invention is not limited to any theory, it is believed that certain fillers contain either acidic or basic species which can lower or raise the pH of the compound. For example, some coal-based fly ash fillers for example reduce pH while others increase it, depending on source of the coal being converted to energy. This may be due to the presence of species such as MgO and CaO, which can be converted to hydroxides and raise pH. A compound pH of greater than 9.25 has been found to significantly reduce pot life and cure. Conversely, a compound pH of less than 7.0 tends to increase pot life at the expense of long cure times.

For this reason, it is preferred to adjust the pH of the compounded polyol/filler mixture to within the range of 7.0 to 9.25, more preferably from 7.5 to 9.0 and especially from 7.5 to 8.5. pH adjustment can be done by adding acids (to lower pH) or bases (to raise pH). Suitable acids include inorganic acids such as phosphoric, sulfuric, boric or hydrochloric acids. Organic acids such as acetic, formic, benzoic, citric and lactic acids are also useful. Phosphoric acid is preferred. Bases that can be used to adjust pH upwardly include NaOH, KOH, CaOH, NaBO$_3$, trisodium phosphate, sodium silicate and the like. CaOH is a preferred base.

pH of the compound is determined by dissolving 10 grams, of the compound in 60 milliliters of a solution of 1 part water to 10 parts methanol. The insoluble filler is permitted to settle out. The liquid phase is allowed to sit for about 10 minutes, and the pH is then measured using any suitable probe.

If an attached cushion is to be applied to the substrate, the polyurethane-forming composition will also include at least one surfactant, which serves to stabilize the foam bubbles until the composition has cured. Organosilicone surfactants, such as those described in U.S. Pat. No. 4,483,894, are preferred. Typically about 0.5 to about 3 parts of surfactant are used per 100 parts by weight polyol or polyol mixture.

Similarly, the polyurethane-forming composition may include water or a physical blowing agent, in order to provide some supplemental blowing and added expansion, in cases where an attached cushion is to be applied. Water is preferred and if used is suitably present in an amount of at least 0.25 part by weight per 100 parts by weight of the polyol. Suitable amounts are from 0.5 to about 3.0 parts of water per 100 parts by weight polyol, especially from 0.6 to 2.5 parts by weight of water per 100 parts by weight polyol.

Other additives may be used, including fire retardants, pigments, antistatic agents, reinforcing fibers, antioxidants, preservatives, water scavengers, thixotropes, and the like.

The polyurethane-forming composition is advantageously formulated so that it exhibits a cure time of less than 150 seconds. Cure time is measured for purposes of this invention by bringing all components to 37.7° C., mixing them at that temperature, and measuring the time required for the reacting mixture to cure. In the case of a non-cellular material, a portion of the mixture is deposited onto a Teflon™ sheet to form a ⅛ inch layer. This is placed into an oven and cured at 129° C. Cure time is the time required at that temperature to produce a tack-free polymer. A polymer is considered to be tack-free if, when contacted with a tongue depressor, the polymer releases cleanly from the probe. In the case of a cellular polymer, a ⅛ inch (3 mm) layer is formed on a Teflon™ sheet as before, and placed into a forced air oven at 121° C. Cure time is the time required at that temperature to achieve total foam recovery from an applied depressive force. Total foam recovery is indicated when, after probing the foam with a tongue depressor, the foam totally recovers from the depression made by the probe. A preferred composition has a cure time of less than 150 seconds. Preferably, the mixture exhibits a cure time of from 75 to 135 seconds and especially from 75 to 120 seconds.

The composition also advantageously exhibits a pot life at least 8 minutes at 38° C. Pot life, for purposes of this invention, is the time, after all polyols, isocyanates and catalysts are brought together, that is required for the composition to react sufficiently to develop a viscosity of 100,000 cps. Pot life is evaluated by bringing all components except the catalyst and heating to 38° C. The catalyst is then added with stirring. After 30 seconds, the mixture is placed in a test tube in a 38° C. bath. The viscosity of the mixture is then measured using a Brookfield viscometer with a #7 spindle at 20 rpm, and the time required for the composition to attain a viscosity of 100,000 cps is measured. The required time is greater than 8 minutes, more preferably greater than 10 minutes and most preferably greater than 12 minutes.

General methods for applying a polyurethane composition to a substrate are well-known and described, for example, in U.S. Pat. Nos. 3,849,156, 4,296,159, 4,336,089, 4,405,393, 4,483,894, 4,611,044, 4,696,849, 4,853,054, 4,853,280, 5,104,693, 5,646,195, 6,140,381, 6,372,810 and 6,790,872. The general methods described there are applicable to this invention. The main processing steps are the blending of all the components, including surfactants (if used) and the catalysts; frothing, dispensing, and gauging.

It is usually convenient to form a partially formulated polyol component beforehand. The component includes the polyol mixture, filler and typically the surfactant (when used). The formulated polyol component is blended with the polyisocyanate immediately prior to dispensing (or frothing, in cases where the composition is frothed). The catalyst package can be added into the formulated polyol, added simultaneously with the polyisocyanate, or added during or after the frothing step. It is generally desired to delay adding the catalyst as long as possible in order to maximize the time that is available to complete the remaining process steps. When the catalyst is added after the frothing step, the froth and catalyst are advantageously passed through a static mixing device (such as a Chemineer-Kenics mixer, TAH mixer or other motionless mixing device), in order to more uniformly blend the components. A static or motionless mixer tends not to significantly degrade the froth or the distribution of the frothing gas within the froth.

It is preferred to froth the polyurethane-forming composition prior to dispensing and gauging it, even when a substantially non-cellular backing is applied. Frothing increases the volume of the composition and thus makes it easier to dispense and gauge accurately. In these cases, the composition preferably contains very little or no surfactant that can stabilize the gas bubbles that are formed in the frothing step. This allows the bubbles to collapse and the frothing gas to escape during or after the gauging step, so a non-cellular polyurethane is produced.

If a cellular attached cushion is to be formed, the polyurethane-forming composition must be blown or frothed. Frothing is by far the preferred method, as blown systems tend to be too reactive. It is possible to use a combination of blowing and frothing techniques.

The composition is frothed by whipping, air, nitrogen, argon or other gas into it before it is dispensed and applied, using any convenient apparatus such as an Oakes mixer, a Lessco mixer or a Hansa Frothing Unit. Methods of preparing such a mechanically frothed mixture are described in U.S. Pat. Nos. 4,853,054, 5,104,693, 5,908,701, 6,040,381, 6,096,401 and 6,555,199, all incorporated herein by reference. The polyurethane-forming composition is generally frothed to a froth density of about 300 to 600, especially from 400 to 500, grams/liter prior to application.

The resulting polyurethane-forming composition, whether frothed or not, is dispensed to form a puddle on one side of the substrate. The puddle is formed into a layer of the desired thickness or coating weight, and the assembly is then heated to complete the cure. A variety of equipment types are suitable for dispensing the polyurethane-forming composition and forming it into a layer. A preferred method of dispensing the composition is through a traversing dispensing nozzle, hose or head, which travels back and forth across the substrate to dispense the composition more or less evenly across the surface of the substrate. The composition is suitably dispensed upstream of a doctor blade, which gauges the composition to a desired thickness and helps to force the composition onto the surface of the substrate. Another suitable apparatus for forming the polyurethane-forming composition into a layer and gauging it is an air knife.

The composition is suitably applied at a coating weight of from about 10 to about 70 ounces/square yard (0.33-2.31 kg/M$^2$), and n particular from about 15 to about 30 ounces per square yard (0.49-0.99 kg/m$^2$). The thickness of the applied layer, when applied as a froth, is generally from about 0.05 to about 0.5 inches (0.13-1.3 cm), preferably from about 0.1 to about 0.25 inch (0.26-0.65 cm). If the cells of a froth are not stabilized, the applied layer will usually collapse as or after it passes under the doctor blade or air knife to form a thinner layer. When the composition contains a surfactant, the thickness of the layer after gauging will be close to or the same as the thickness of the layer as applied and gauged.

Because the polyurethane-forming composition develops viscosity so slowly at temperatures as high as 50° C., control over temperature during the mixing, frothing, dispensing and gauging steps need not be as stringent as is necessary when other catalyst packages are used. As a result, the composition may achieve a temperature as high as 50° C. in the presence of the polyol(s), polyisocyanate(s) and catalyst as any or all of those steps are performed. A preferred temperature is up to 45° C. and a more preferred temperature is up to 38° C. This greater latitude in processing temperature permits one to use these higher temperatures to decrease the viscosity of the composition in order to make it easier to froth, dispense and gauge. It also reduces or eliminates the need to remove waste heat from the system or to cool the components, as may be necessary in warm environments or in the summer months.

Lower processing (mixing frothing, dispensing and gauging) temperatures can of course be used with this invention if desired. The processing temperature may be any lower temperature at which the composition is a fluid, but temperatures below 18° C. are not preferred due to the increased viscosity of the composition. A preferred temperature is at least 24° C. A typical maximum processing temperature for the fully formulated composition during the mixing, frothing, dispensing and gauging steps is from 31 to 50°, especially from 31 to 45° C. and especially from 31 to 38° C.

When high levels of filler (as described before) are used, the composition is more preferably frothed, dispensed and gauged while within a temperature range of from 32 to 45° C., especially from 35 to 42° C. The composition may be heated to the aforementioned temperature ranges prior to frothing, dispensing and gauging. Waste heat from those process steps (in particular the frothing step) may be used to heat the composition to within those ranges.

The polyurethane-forming composition is cured after the gauging step. Curing is preferably effected by subjecting the applied layer of polyurethane-forming composition to an elevated temperature. The curing temperature is selected to provide a rapid cure without degrading any components of the composition or the substrate. A temperature range of from 80 to 180° C., especially from 120 to 150° C., is suitable. The composition preferably becomes cured in less than 3 minutes, and more preferably less than 2.5 minutes and especially less than 2.0 minutes.

After the polyurethane is cured sufficiently, the product is advantageously cooled to below 40° C., especially below 35° C., before being flexed or bent (such as by rolling or cascading it into an accumulator device). This cooling before flexing or bending is especially preferred in cases where the product is intended to be die-cut or designed to function as independent modules, as in the case of carpet tiles.

A wide variety of materials can function as the substrate, including, for example, polymeric films or sheets, carpet (including pile yarn carpet), textile fabrics, paper sheets, rigid materials such as wood, veneers, metal foils or sheets, or composites, among many others.

A substrate of particular interest is a tufted or woven carpet material. The carpet includes a primary backing that defines multiple openings through which a facing fiber is tufted or woven to produce a carpet face. The primary backing is generally in the form of a woven or nonwoven scrim, and can be made of any convenient material, such as, for example, jute, polypropylene, nylon, a polyester, a polyacrylate, cotton, wool, or other material. The facing fiber also can be of any convenient material, such as wool, cotton, nylon, a polyester, an acrylic fiber, polypropylene, polyethylene, a blend of any two or more of these, or the like. The facing fiber is typically in the form of fiber bundles that are tufted or woven through the primary backing to produce a carpet face and an opposing underside. In one embodiment, a non-cellular polyurethane is applied in accordance with the invention to form a non-cellular backing, such as a precoat, laminate, unitary, tie-coat or hard back cap coating. Alternatively or additionally, a cellular polyurethane cushion can be attached to the carpet in accordance with the invention.

The carpet backings of the invention have particular applicability in the residential and commercial carpet industry as well as in carpeting for recreational use, such as boats, cars, patios, synthetic tuft, etc.

The following examples illustrate the present invention but are not intended to limit the scope thereof. All parts and percentages are by weight unless otherwise indicated. Unless stated otherwise, all molecular weights expressed herein are weight average molecular weight.

EXAMPLE 1 AND COMPARATIVE SAMPLES A-C

A polyol mixture is formed by blending 46 parts of a 3000 molecular weight, nominally trifunctional random copolymer of 8 wt % EO and 92 wt % PO, 46 parts of a 2000 molecular weight, nominally difunctional 12 wt % EO-capped polypropylene oxide) and 8.0 parts diethylene glycol. The polyol mixture, 190 parts of calcium carbonate particles, 0.5 part of a viscosity reducing agent and 1.0 part of a 10% nickel acetylacetonate solution (available as Niax LC5615 catalyst from General Electric) are compounded together using a Cowles blade rotating at 2000 rpm until the compound temperature reaches 49° C. through the generation of waste heat. The mixture is allowed to come to room temperature. The compound is blended with 39.4 parts of a polymeric MDI/MDI hard segment prepolymer blend (ISONATE® 7594 isocyanate) to an isocyanate index of 105, and the blend is mixed with the Cowles blade until the compound temperature reaches 38° C. One part of a 0.5% solution of di-n-butyltin sulfide is added at that temperature and mixed for 30 seconds to produce formulation Example 1.

A portion of the resulting polyurethane-forming composition is transferred to a test tube that is immersed in a 38° C. bath. The Brookfield viscosity is determined periodically using a #7 spindle at 20 rpm. The pot life (time to reach a viscosity of 100,000 cps) is 30 minutes.

Another portion of the resulting polyurethane-forming composition is placed into a 121° C. oven and evaluated for curing time as described before. The curing time for this composition is 2 minutes and is ideal for attainment of fast economical processing speeds.

Comparative Sample A is made and tested in the same manner, except that it contains 0.01 part di-n-butyltin sulfide as the only catalyst (i.e. the nickel acetylacetonate catalyst is omitted during compounding). The pot life of this formulation is 15 minutes, which is acceptable. However, the cure time for this system is 2.5 minutes, which is slow for optimum processing speeds.

Comparative Sample B is made in the same manner as Example 1, except the catalyst is di-n-butyltin sulfide at a concentration of 0.005 parts per 100 parts polyol mixture and no nickel acetylacetonate is present. The pot life of this system is 20 minutes but the system requires 3 minutes to cure.

Comparative Samples A and B illustrate the trade-off between pot life and cure time using the di-n-butyltin sulfide catalyst by itself.

Comparative Sample C is made in the same manner as Example 1, except no dibutyltin sulfide catalyst is present. The pot life for this system is 58 minutes but cure time is now 3.5 minutes, which is too slow for an economical process.

EXAMPLE 2 AND COMPARATIVE SAMPLE D

A polyol mixture is formed by blending 67 parts of a 2000 molecular weight, nominally difunctional polypropylene oxide) polyol, 15 parts of a 3000 molecular weight, nominally trifunctional random copolymer of 8 wt % ethylene oxide and 92 wt % propylene, 13 parts of dipropylene glycol and 5 parts of an adduct of aniline and two moles of propylene oxide. The polyol mixture, 0.05 parts of 85% $H_3PO_4$, 5 parts 5A mole sieves (available from UPO), 1.5 parts of Code 5027 viscosity reducing agent (available from Fibro Chem Inc.), 400 parts of a particulate coat fly ash (available from Boral as Celceram™ PV20A filler) and 1.0 part of the LC5615 catalyst solution are compounded together using a Cowles blade rotating at 2000 rpm, until the compound temperature reaches 49° C. through the generation of waste heat. The compound is brought down to room temperature and blended with 60 parts of a liquefied MDI/MDI hard segment prepolymer blend (available from Dow Chemical as ISONATE® 7560 isocyanate) to an isocyanate index of 117. The blend is mixed with the Cowles blade until the compound temperature reaches 38° C. through the generation of waste heat. Di-n-butyltin sulfide (0.015 part) is added and mixed in for 30 seconds to produce formulation Example 2.

The pH of the compounded polyol is 8.3.

A portion of the resulting polyurethane-forming composition is transferred to a test tube that is immersed in a 38° C. bath. The Brookfield viscosity is determined periodically using a #7 spindle at 20 rpm. The pot life is 12.5 minutes.

Another portion of the polyurethane-forming composition is placed into a 129° C. oven and evaluated for curing time as described before. The curing time for this composition is 2 minutes, which permits the composition to be processed at economical processing speeds on a commercial scale.

Comparative Sample D is made in the same manner, except the phosphoric acid is omitted and the level of dibutytin sulfide is reduced to 0.005 part. The compounded polyol has a pH 9.43; at this pH the pot life of the composition is only 8.33 minutes, despite the reduced di-n-butyltin sulfide level. Because of the reduced catalyst level, the cure time for this system is 2.75 minutes, which is too long to operate a commercial scale process economically.

EXAMPLE 3 AND COMPARATIVE SAMPLES E

A polyol mixture is formed by blending 88 parts of a 4800 molecular weight, trifunctional poly(propylene oxide) polymer capped with 13% ethylene oxide with 12 parts of diethylene glycol. The polyol mixture, 0.05 parts of 85% $H_3PO_4$, 5 parts 5A mole sieves, 1.5 part of Code 5027 viscosity reducing agent, 300 parts of Celceram™ PV20A filler and 1.0 part of the LC5615 catalyst solution are compounded together using a Cowles blade rotating at 2000 rpm, until the compound temperature reaches 49° C. through the generation of waste heat. The mixture is allowed to come to room temperature and blended with 46.8 parts of a polymeric MDI/MDI soft segment prepolymer (available from Dow Chemical as ISONATE® 7045 isocyanate) to an isocyanate index of 105. This blend is mixed with the Cowles blade until the system temperature reaches 38° C. Di-n-butyltin sulfide (0.005 part) is added and mixed in for 30 seconds to produce formulation Example 3.

The pH of the compounded polyol is 8.3. The pot life of the composition is 8.75 minutes. Its cure time is 2 minutes at 121° C.

Comparative Sample E is made in the same manner, except the phosphoric acid is omitted and the level of di-n-butyltin sulfide is reduced to 0.005 part. The compounded polyol has a pH 9.43; at this pH the pot life of the composition is only 3.6 minutes even with the reduced level of dibutyltin sulfide level. The cure time for this system is 2.0 minutes at 121° C.

From the foregoing, it will be observed that numerous variations and modifications may be effected without departing from the true spirit and scope of the novel concepts of the invention.

What is claimed is:

1. A process comprising:
   a) forming a polyurethane-forming composition, the polyurethane-forming composition including a polyol having an equivalent weight of at least 300 or a mixture thereof with at least one other isocyanate-reactive material, at least one polyisocyanate in an amount sufficient to provide an isocyanate index of from 85 to 130, a particulate inorganic filler, from 0.05 to 0.5 part by weight per 100 parts by weight of isocyanate-reactive materials of a nickel, cadmium or copper acetylacetonate catalyst, and from 0.001 to 0.1 part by weight per 100 parts by weight of isocyanate-reactive materials of an organotin catalyst in which each tin atom is bonded to at least one sulfur atom;
   b) forming a layer of the composition on a substrate; wherein the maximum temperature of the composition during steps a) and step b) is from 31 to 50° C. and then
   c) heating the composition to a temperature from 80 to 180° C. to cure the composition and form a polyurethane layer bonded to the substrate.

2. The process of claim 1 wherein the polyurethane-forming composition contains a nickel acetylacetonate catalyst.

3. The process of claim 2 wherein the organotin catalyst is dibutyltin sulfide.

4. The process of claim 3 wherein the polyurethane-forming composition contains from about 250 to about 400 parts of filler per 100 parts by weight of isocyanate-reactive materials.

5. The process of claim 4 wherein the pot life of the polyurethane-forming composition is at least 8 minutes.

6. The process of claim 5 wherein the cure time of the polyurethane-forming composition is from 75 to 135 seconds.

7. The process of claim 6 wherein the polyurethane-forming composition contains from 0.1 to 0.3 parts by weight of nickel acetylacetonate per 100 parts by weight of isocyanate-reactive materials.

8. The process of claim 7 wherein the polyurethane-forming composition contains from 0.005 to 0.025 parts of dibutyltin sulfide per 100 parts by weight of isocyanate-reactive materials.

9. The process of claim 8 wherein the substrate is a carpet.

10. The process of claim 8 wherein the polyurethane-forming composition contains at least one surfactant.

11. The process of claim 10 wherein the polyurethane-forming composition is frothed prior to step b).

12. The process of claim 11 wherein the polyurethane layer is cellular.

13. The process of claim 9 wherein the polyurethane layer is non-cellular.

14. The process of claim 13 wherein a fiberglass or secondary fabric is brought into contact with the layer of the polyurethane-forming composition during or after step b), and step c) is conducted with the fiberglass or secondary fabric in contact with the polyurethane layer to form a laminate having the fiberglass or secondary fabric adhered to the polyurethane layer.

15. A process comprising forming a compounded polyol having pH of from 7.0 to 9.25, the compounded polyol containing at least one polyol, from 0.05 to 0.5 part by weight per 100 parts by weight of isocyanate-reactive materials of a nickel, cadmium or copper acetylacetonate catalyst and at least one particulate organic filler, forming a polyurethane-forming composition by mixing said compounded polyol with at least one polyisocyanate and at least one organotin catalyst in which each tin atom is bonded to at least one sulfur atom, forming the composition into a layer on a substrate; and then curing the composition to form a polyurethane layer bonded to the substrate.

16. The process of claim 15 wherein the compounded polyol has a pH of from 7.5 to 9.0.

17. The process of claim 16 wherein the compounded polyol has a pH of from 7.5 to 8.5.

* * * * *